United States Patent [19]
Onda et al.

[11] 3,946,413
[45] Mar. 23, 1976

[54] SHUTTER BLADE REBOUND PREVENTIVE DEVICE FOR CAMERA SHUTTER

[75] Inventors: Eiichi Onda; Mitsuo Koyama; Tadashi Nakagawa, all of Yotsukaido, Japan

[73] Assignee: Seiko Koki Kabushiki Kaisha, Japan

[22] Filed: Dec. 31, 1974

[21] Appl. No.: 537,768

[52] U.S. Cl.................................. 354/251; 354/252
[51] Int. Cl.².................... G03B 9/06; G03B 9/08
[58] Field of Search............................ 354/251, 252

[56] References Cited
UNITED STATES PATENTS

| | | | |
|---|---|---|---|
| 3,644,026 | 2/1972 | Toda | 354/252 |
| 3,714,880 | 2/1973 | Kitai | 354/252 |

Primary Examiner—L. T. Hix
Assistant Examiner—Russell E. Adams, Jr.
Attorney, Agent, or Firm—Robert E. Burns; Emmanuel J. Lobato; Bruce L. Adams

[57] ABSTRACT

A camera shutter having a plurality of shutter blades operable from a shutter-closing operative position to a shutter-opening operative position and back to the shutter-closing operative position. An opening driving lever and a closing driving lever are provided for operating the shutter blades to their operative positions. A rebound preventing arrangement is provided by providing pins fixed on the opening and driving levers and making provision on a cocking lever for holding the driving levers from rebounding upon reaching their terminal operating positions in activating the shutter blades in opening and closing the shutter. The pins on the driving levers are engaged at these terminal positions by the locking lever and releasably held to preclude rebounding thereby to preclude rebounding of the shutter blades.

3 Claims, No Drawings

3,946,413

SHUTTER BLADE REBOUND PREVENTIVE DEVICE FOR CAMERA SHUTTER

BACKGROUND OF THE INVENTION

This invention relates generally to camera shutters and more particular to a shutter blade rebound preventive device for a camera shutter.

Generally speaking, camera shutters are constructed such that the shutter driving levers, placed in the shutter cocking position, are operated to the shutter opening and closing position by a spring force during the progress of the shutter release operation. But these known constructions have a fault in that in opening and closing the shutter the driving levers collide with their stop position and rebound causing non-uniformity of exposure and reexposure because of the rebound of the shutter blades interlocked therewith.

In order to prevent this phenomenon, formerly the following means have been proposed: a means to prevent the rebound of the driving lever by providing it with a rebound preventive device which has a concave cam part and by receiving in the above cam part a pin of the driving lever flipped to the opening and closing position or a means to absorb the rebound force of the driving lever by developing friction preventing rebounding by use of a friction piece on the driving lever. But in the former means the cam of the rebound preventive lever might prevent oscillation of the shutter driving lever in case of a rapid cocking operation. This becomes a serious shortcoming, for instance, for a camera of which high speed photography is demanded. In order to secure operation of the rebound preventive lever it is necessary to make quite strong its spring force, but when the spring force is made stronger in the former means, it is undesirable since the load in the case of the driving lever disengaging from the cam part in the cocking operation directly affects a smooth operation in cocking the shutter. In the latter case the shutter not only lacked durability, but also had the shortcoming that the stop position of the driving lever became so unstable that operation became uncertain and the charging or cocking operation became heavy.

SUMMARY OF THE INVENTION

It is a principal object of the present invention to provide a camera shutter provided with a rebound preventive device for precluding rebounding of the opening driving lever and the closing driving lever that operate the shutter blades to an open and a closed position. This precludes rebounding of the shutter blades so that accurate exposure are taken.

The camera shutter comprises a plurality of shutter blades operable to operative positions for opening and closing an exposure aperture. Operating means are connected to the shutter blades for operating the shutter blades to their operative positions. Rebound preventing means in the operating means preclude the operating means from rebounding upon reaching terminal operating positions thereof corresponding to reaching of the operative positions of the shutter blades. The shutter blades are accordingly precluded from rebounding and causing an inadequate exposure. The rebound preventing means comprise driving levers which are part of the operating means and another lever. Means are provided on these levers for engaging the driving levers with another lever when either of the driving levers reaches a terminal operating position and precluding rebounding of the driving levers. Means are provided to relatively displace the driving levers for opening and closing the shutter aperture.

BRIEF DESCRIPTION OF THE DRAWINGS

Other objects and advantages will appear from the following description of examples of a camera shutter embodying the invention, and the novel features will be particularly point out in the appended claims and drawings.

DESCRIPTION OF THE PREFERRED EMBODIMENTS

Figure 1:
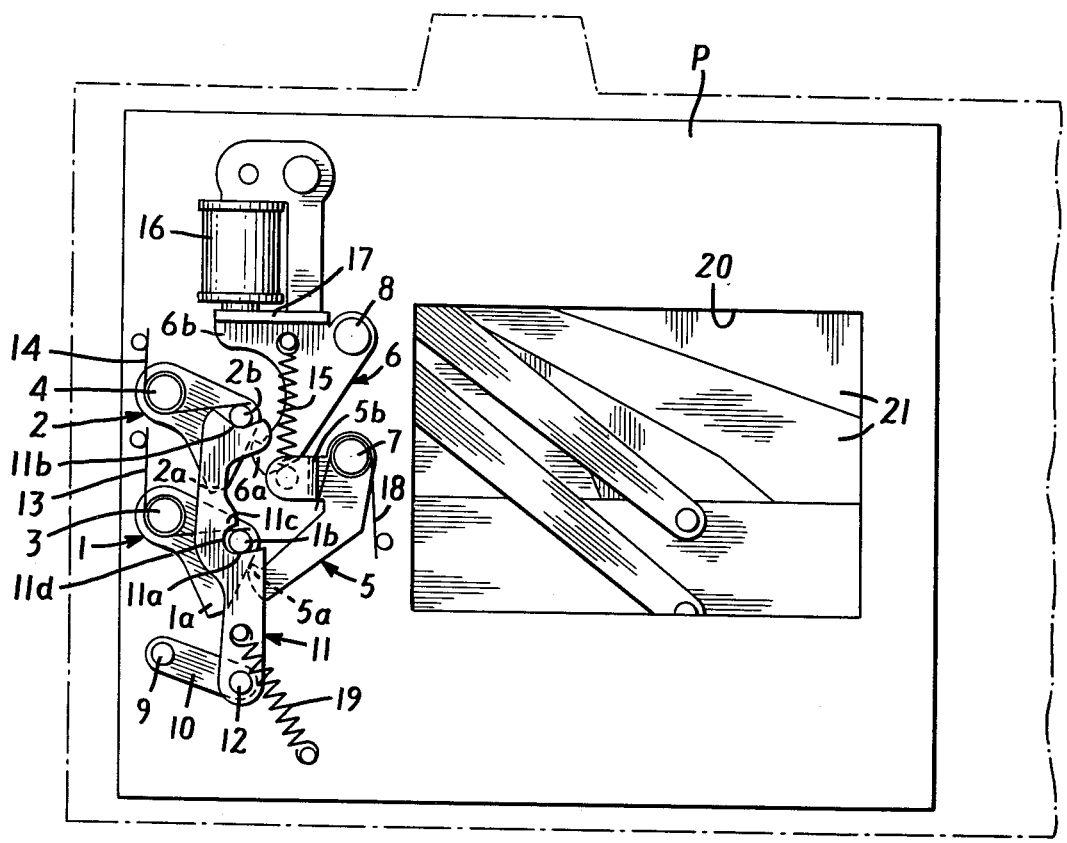
FIG. 1 is a plan view of a camera shutter according to the invention illustrated before it is cocked.

FIG. 1 shows the conditions before a shutter according to to the invention is cocked. A shutter opening driving lever 1 and a shutter closing driving lever 2 of the same shape are oscillatably supported on the left hand side a base plate P by pivots 3 and 4 respectively on upper and lower positions. On the right hand side of these levers 1 and 2 locking claws 5 and 6, which are to block those levers 1 and 2, are oscillatably supported on pivots 7 and 8. One end of an interlocking lever 10 is fixed on a shutter cocking axis 9, which is rotatably supported by the base plate P, near the lower part of the above opening driving lever 1. Its other end is oscillatably connected by a pin 12 with the lower end of a cocking lever 11 which extends over the above opening and closing levers 1 and 2. Cocking driving axis or pivot 9 is usually rotated by a cocking operation lever and is constantly urged in a clockwise direction by a spring (not shown).

Opening and closing driving levers 1 and 2 have respectively locking parts 1a and 2a on their tips and in their middle part fixed pins 1b and 2b for cocking respectively project. Springs 13, 14 urge these driving levers in a clockwise direction. Locking claws 5 and 6 have, on their tips, claws 5a and 6a which are to be locked with locking parts 1a and 2a of the driving levers 1 and 2. They also respectively have arms 5b and 6b in a forked shape and both arms are connected by a spring 15. One of the above arms 6b is provided with an iron piece 17 which is to be attracted by an electromagnet 16. Electromagnet 16 is connected electrically with an ordinary exposure-time control circuit (not shown). A spring 18 urges the locking claw 5 in a clockwise direction and constantly presses the other locking claw 6, which contacts with arm 5b, against the electromagnet 16. The one locking claw 5 is oscillated by an ordinary shutter release operation lever (not shown).

On the middle part and upper end of the cocking lever 11 notches 11a and 11b are formed open upwardly and somewhat curved shape to support sliding pins 1b and 2b of the above opening and closing driving levers and on one of the notches 11a controlling part 11c of cam shape is formed to check rebound of sliding pin 1b. This rebound preventing part 11c projects to a position which encircles nearly the left-upper half of the notch 11a and its inner side and forms notch or groove 11d which contacts with nearly left half of sliding pin 1b. Its outside is gently inclined in the axial direction of the cocking lever 11. A cocking spring 19 urges the cocking lever in a clockwise direction.

Figure 2:
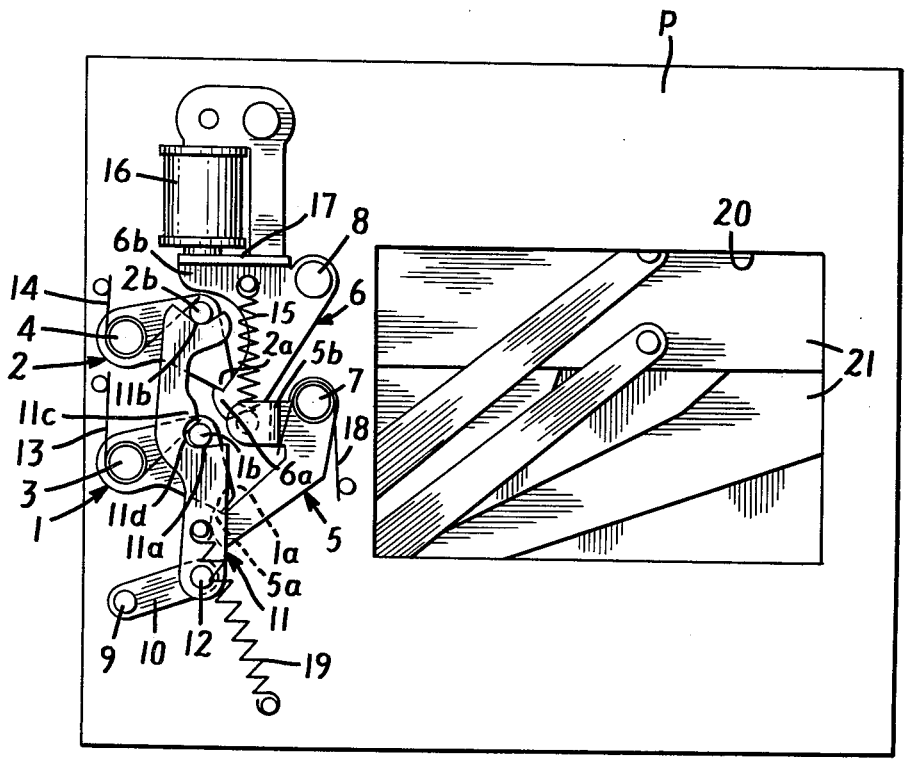
FIG. 2 is a plan view of the camera shutter in FIG. 1 illustrated in a preliminary phase of the cocking thereof.
Figure 3:
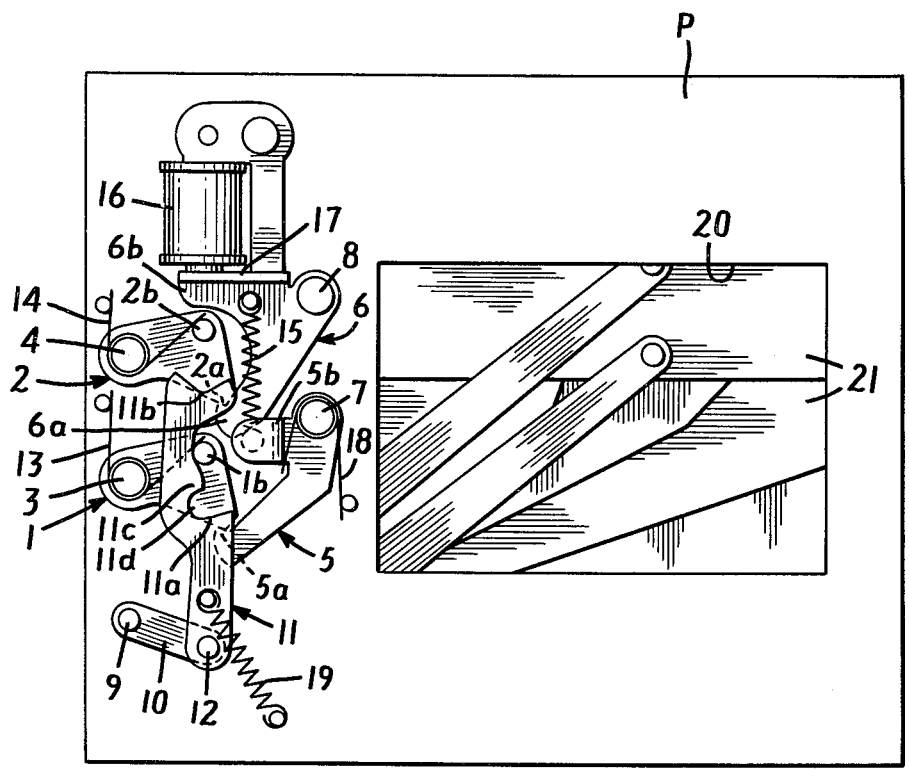
FIG. 3 is a plan view of the camera in FIG. 2 illustrated in a fully cocked condition.

A window or exposure aperture is provided on the right side of the base plate P. A group of shutter blades 21 for opening and closing the shutter aperture is opened and closed by oscillation of the above opening and closing driving levers 1 and 2 through a known mechanism. Following is an explanation of this invention. When the driving axis or pivot 9 is rotated in a counterclockwise direction from the conditions in FIG. 1 by the shutter cocking operation the interlocking lever 10 rotates in the same direction and pushes up cocking lever 11 in opposition to its biasing spring 19. Thereby, the notches 11a and 11b of the cocking lever push the driving lever pins 1b and 2b to rotate driving levers 1 and 2 in a counterclockwise direction in opposition to their biasing springs 13 and 14 and locks their locking parts 1a and 2a with claws 5a and 6a of the locking claws 5 and 6 to establish the conditions shown in FIG. 2. When the shutter cocking operation is released, the driving axis 9 returns to its original position by spring action. The cocking lever 11 moves down being pulled by its spring 19 with the driving levers 1 and 2 being left in a locked state locked with the locking claws 5 and 6. In that case the controlling part disengages from the sliding pin 1b sliding down its left half side. The shutter cocking operation is completed in this way and the conditions shown in FIG. 3 exist.

As the shutter release operation takes place the electromagnet 16 is excited and attracts the locking claw 6. Then the other locking claw 5, interlocked with the release operation, rotates in a counterclockwise direction to unfasten or effect unlocking of its claw 5a from the opening driving lever 1 and thereby the opening driving lever 1 rotates in a clockwise direction to open the shutter. In that case the sliding pin 1b of the driving lever 1 slides along the outer slope of the rebound preventing part 11c and engages into the receiving groove or notch 11d, thereby rotating the cocking lever 11 somewhat in a counterclockwise direction. Then even when driving lever pin 1b collides with the notch 11a and tries to rebound in counterclockwise direction the rebound preventing part 11c checks it. Therefore there will be no disturbance of the shutter blades. When the electromagnet 16 is demagnetized or deenergized after the lapse of the given exposure time, the locking claw 6 is pulled by its spring 15 and rotates in a counterclockwise direction to unfasten locking of its claw 6 with the closing driving lever 2. Thereby the closing lever 2 is released and rotates in a clockwise direction to close the shutter blades. The sliding pin 2b stops by colliding or engaging with the notch 11b.

Figure 4:
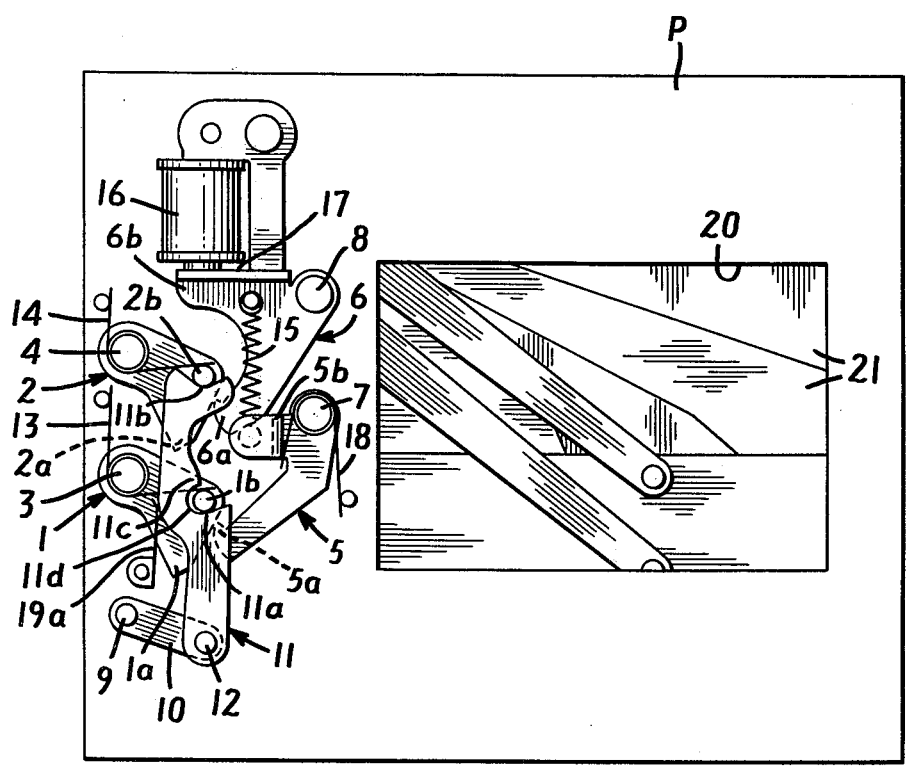
FIG. 4 is a plan view of a second embodiment of a camera shutter according to the invention in an uncocked condition.

FIG. 4 is an example in which the above cocking spring 19 is replaced by a spring plate 19a which is pressed against the left side of the cocking lever 11 to urge it in a clockwise direction. According to this example, the spring force of the spring plate 19a is not a heavy load on the cocking operation for turning the driving axis 9. Besides even if the spring force of the spring plate 19a is made stronger, it does not affect the other mechanisms. The other parts correspond to those having the same part references as those already described.

It is also possible to prevent rebound of the closing driving lever 2 by providing a receiver notch 11b in the cocking lever 11 in the above example with a rebound controlling part for the sliding pin 2b. Both of the above examples are the case of application to the shutter with two shutter opening and closing driving levers 1 and 2 but the invention can also be applied to a shutter with one shutter driving lever which opens and closes the shutter. In addition this invention can be applied not only to a focal plane shutter but also to a lens shutter. The same effect can also be obtained by cocking relations between rebound preventing part 11c and the sliding pin 1b as follows: to form the rebound preventing part on the driving lever 1 and to install the sliding pin on the cocking lever 11.

According to the blade rebound preventive device in the camera shuttter of this invention, since the receiver notches and rebound preventing part are directly installed on the shutter cocking part the above rebound preventing part moves together with the shutter driving part during the shutter cocking operation and thereby the shortcoming which is formed in the know devices and arises in rapid cocking, can be eliminated. Since the shutter driving part disengages from the rebound preventing part on the returning process of the shutter cocking part after shutter cocking is completed; the shutter cocking operation can be made lighter without affecting its feeling and even when preventing action of the rebound preventing part on the shutter driving part is made stronger. Consequently disturbance usually caused by reound of the shutter blades can be prevented positively.

What we claim and desire to secure by Letters Patent:

1. In a camera shutter having an exposure operture; a plurality of shutter blades operable to opened and closed positions for opening the exposure aperture and closing it; operating means connected to the shutter blades for operating the shutter blades to said opened and closed positions; rebound preventing means in said operating means to preclude the operating means from rebounding upon reaching terminal operating positions thereof corresponding to reaching of said opened and closed positions of said shutter blades thereby to preclude rebounding of said shutter blades when they reach said opened and closed positions; said rebound preventing means comprising relatively displaceable driving levers constituting part of said operating means and cocking means, means on said driving levers for engaging said driving levers with said cocking means when either of said driving levers reaches a terminal operating position and for precluding rebounding of said driving levers; and said operating means including means to relatively displace said driving levers.

2. In a camera shutter according to claim 1, in which said cocking means comprises a cocking lever, each of said driving levers having a locking pin engaged by said cocking lever for driving said driving levers to a cocked position, means for actuating said cocking lever for cocking said driving levers, and means to restore said cocking lever to a rest position for engaging said pins when said driving levers reach said terminal operating positions.

3. In a camera shutter according to claim 2, in which said cocking lever comprises a respective notch within which a corresponding cocking pin is received and held when each said driving lever reaches a terminal operation position thereof.

* * * * *